US008976625B2

United States Patent
Blias (10) Patent No.: US 8,976,625 B2
(45) Date of Patent: Mar. 10, 2015

(54) OPTIMIZATION APPROACH TO Q-FACTOR ESTIMATION FROM VSP DATA

(75) Inventor: Emanouil Blias, Houston, TX (US)

(73) Assignee: Baker Hughes Incorporated, Houston, TX (US)

(*) Notice: Subject to any disclaimer, the term of this patent is extended or adjusted under 35 U.S.C. 154(b) by 677 days.

(21) Appl. No.: 13/281,051

(22) Filed: Oct. 25, 2011

(65) Prior Publication Data

US 2012/0106294 A1 May 3, 2012

Related U.S. Application Data

(60) Provisional application No. 61/407,605, filed on Oct. 28, 2010.

(51) Int. Cl.
*G01V 1/40* (2006.01)
*G01V 1/42* (2006.01)

(52) U.S. Cl.
CPC ............. *G01V 1/42* (2013.01); *G01V 2210/62* (2013.01); *G01V 2210/584* (2013.01)
USPC ............................................. 367/57; 702/17

(58) Field of Classification Search
CPC  G01V 1/42; G01V 2210/584; G01V 2210/62
USPC ............................................. 367/57; 702/17
See application file for complete search history.

(56) References Cited

U.S. PATENT DOCUMENTS

| | | | |
|---|---|---|---|
| 6,931,324 B2 | 8/2005 | Taner et al. | |
| 6,954,402 B2 | 10/2005 | Brygynevych | |
| 7,376,517 B2 | 5/2008 | Rickett | |
| 8,553,498 B2* | 10/2013 | Hu | 367/47 |
| 2004/0122596 A1* | 6/2004 | Sudhakar et al. | 702/17 |
| 2009/0168599 A1 | 7/2009 | Suarez et al. | |

OTHER PUBLICATIONS

Hamilton, Edwin L., "Compressional-wave attenuation in marine sediments," Geophysics, vol. 37, No. 4, pp. 620-646 (Aug. 1972).
Toksoz, M.N. et al.,: Attenuation of seismic waves in dry and saturated rocks: 1. Laboratory measurements, Geophysics, vol. 44, No. 4, pp. 681-690 (Apr. 1979).
Hauge, P., "Measurements of attenuation from vertical seismic profiles," Geophysics, vol. 46, No. 1, pp. 1548-1558 (Nov. 1981).
Stainsby, S.D., et al., "Q estimation from vertical seismic profile data and anomalous variations in the central North Sea," Geophysics, vol. 50, No. 4, pp. 615-626 (Apr. 1985).
Badri, M. et al., "Q measurements from compressional seismic waves in unconsolidated sediments," Geophysics, vol. 52, No. 6, pp. 772-784 (Jun. 1987).
Tonn, R., "The determination of the seismic quality factor Q from VSP data: a comparison of different computational methods," Geophysical Prospecting, vol. 39, pp. 1-27 (1991).
Haase, Arnim B., et al., "Q-factor estimation from borehole seismic data: Ross Lake, Saskatchewan," CREWES Research Report, vol. 15, pp. 1-7 (2003).
Solano, G., et al., "VSP study of attenuation in oil sands," CSEG National Convention, Extended abstracts (2004).

\* cited by examiner

*Primary Examiner* — Ian J Lobo
(74) *Attorney, Agent, or Firm* — Mossman Kumar & Tyler PC (57) ABSTRACT

A zero-offset VSP survey is carried out with spaced apart receivers located in a vertical wellbore. Spectra of the signals at the receivers following wavefield separation are estimated. An absorption coefficient is estimated using differences in spectra between all pairs of receivers.

14 Claims, 5 Drawing Sheets

OPTIMIZATION APPROACH TO Q-FACTOR ESTIMATION FROM VSP DATA

CROSS-REFERENCES TO RELATED APPLICATIONS

This application claims priority from U.S. Provisional Patent Application Ser. No. 61/407,605, filed on 28 Oct. 2010, the disclosure of which is incorporated herein by reference in its entirety.

BACKGROUND OF THE DISCLOSURE

1. Field of the Disclosure

This disclosure relates to a method of measuring the attenuation of seismic waves in earth formations. An attenuation coefficient may provide information about seismic lithology and fluids in earth formations. In addition, the attenuation coefficient is used in deconvolution of seismic data, thereby providing improved imaging of the subsurface. Quantitative analysis of amplitudes is complicated by Q during amplitude variation with offset (AVO) analysis of seismic data where attenuation effects are superimposed on AVO signatures.

2. Description of the Related Art

In surface seismic exploration, energy imparted into the earth by a seismic source reflects from subsurface geophysical features and is recorded by a multiplicity of receivers. This process is repeated numerous times, using source and receiver configurations which may either form a line (2-D acquisition) or cover an area (3-D acquisition). The data which results is processed to produce an image of the reflector using a procedure known as migration.

Sediments in the earth are attenuative, i.e., they absorb seismic energy. One result of the attenuation is that the bandwidth of a propagating seismic signal deceases as the wave propagates into the subsurface. As a result of this reduced bandwidth, the resolution of seismic reflectors decreases with depth. Knowledge of the attenuation coefficient (typically expressed by a constant $\alpha$ in nepers/wavelength of the seismic wave) can be used to deconvolve the seismic data and improve the resolution. In addition, Q is correlated with lithology and is highly dependent on the gas saturation of sediments. Knowledge of Q may thus provide a useful indication of lithology and fluid content of earth formations.

Knowledge of Q is very desirable, yet it is rarely measured. If a well has been drilled, core/laboratory and vertical seismic profiling (VSP) methods can be used. Each method has advantages as well as limitations. Many laboratory-based and field measurements of Q and its dependence on parameters such as lithology and gas saturation have been made on core samples.

The attenuation coefficient $\alpha$ is conventionally estimated using measurements from a Vertical Seismic Profile (VSP), though it may also be estimated from surface seismic data. Vertical (zero-offset) VSPs or check-shot surveys are nearly ideal configurations for estimation of Q. However, even in VSP data, a conventional approach normally provides low vertical resolution and quite often low accuracy. The reason is that in the conventional approach, only a small portion of input data is used to estimate Q. That is why the question of reliable Q-estimates remains. In theory, interval Q may be estimated for all two consecutive receiver depths, but in practice this is impossible. Two consecutive depth spectra may be too similar, and the difference is often so small that the Q estimates have significant errors.

The present disclosure is directed to an improved method of estimating attenuation from VSP data.

SUMMARY OF THE DISCLOSURE

One embodiment of the disclosure includes a method of evaluating an earth formation. The method comprises: acquiring seismic data using a plurality of seismic detectors, each at one of a plurality of spaced apart locations in a wellbore, responsive to activation of a seismic source near a top of the wellbore; estimating a spectrum at each of the plurality of seismic detectors; and estimating an absorption coefficient of the earth formation for at least one pair of the plurality of seismic detectors minimizing an objective function based on an exponential relation between the spectra of the at least one pair of seismic detectors.

Another embodiment of the disclosure includes a system configured to evaluate an earth formation. The system comprises: a plurality of seismic detectors, each positioned at a plurality of spaced apart locations in a wellbore, configured to provide a signal responsive to activation of a seismic source near a top of the wellbore; and at least one processor configured to: estimate a spectrum of the acquired signal at each of the plurality of seismic detectors; and estimate an absorption coefficient of the earth formation for at least one pair of the plurality of seismic detectors minimizing an objective function based on an exponential relation between the spectra of the at least one pair of seismic detectors.

Another embodiment of the disclosure includes a non-transitory computer-readable medium product having stored thereon instructions that when read by at least one processor cause the at least one processor to execute a method. The method comprises: using seismic data acquired by a plurality of seismic detectors, each at one of a plurality of spaced apart locations in a wellbore responsive to activation of a seismic source near a top of the wellbore, for estimating a spectrum of a downgoing wavefield of the acquired seismic data at each of the plurality of seismic detectors; and estimating an absorption coefficient of the earth formation for at least one pair of the plurality of seismic detectors minimizing an objective function based on an exponential relation between the spectra of the at least one pair of seismic detectors.

BRIEF DESCRIPTION OF THE DRAWINGS

The present disclosure is best understood by reference to the attached figures in which like numerals refer to like elements, and in which.

DETAILED DESCRIPTION OF THE DISCLOSURE

Figure 1:
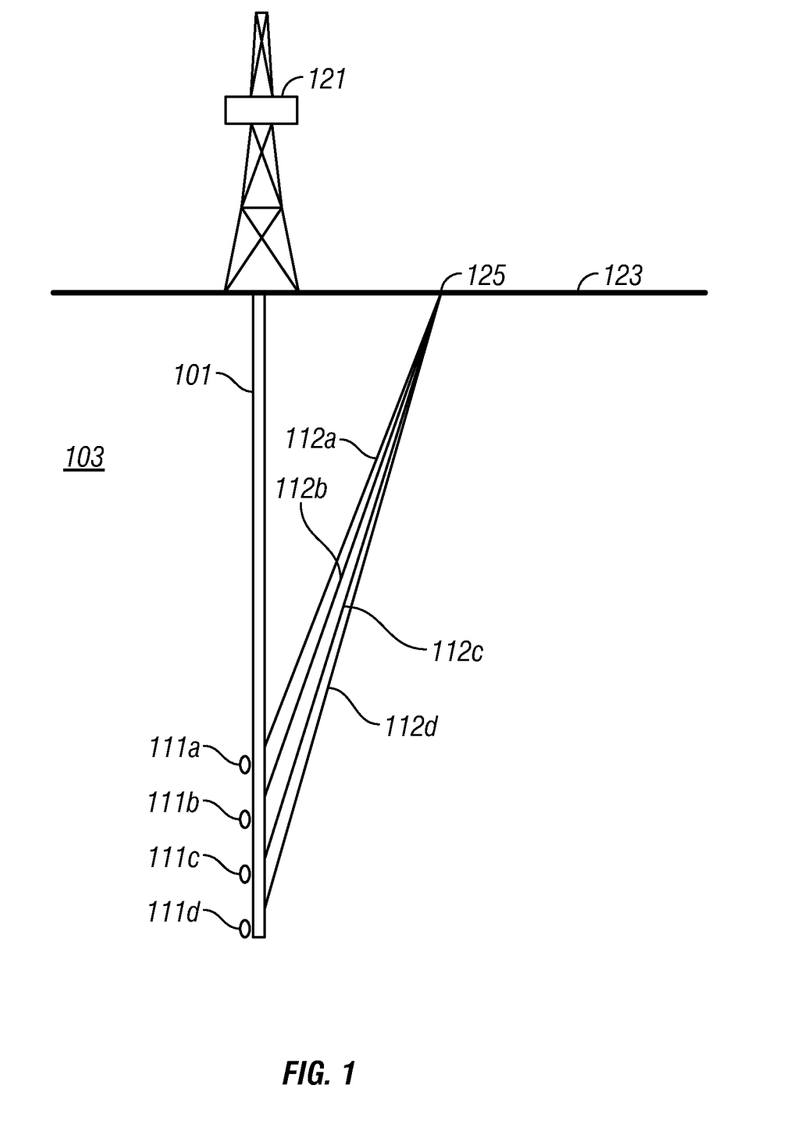
FIG. 1 illustrates the geometry of data acquisition of a VSP according to the present disclosure.

For the present disclosure, the acquisition geometry of a VSP is illustrated in FIG. 1. Shown therein is the surface of the earth 123 with a rig 121 thereon. This may be a drilling rig or it may be a mast rig which conveys a wireline into a borehole 101. The borehole 101 penetrates the subsurface 103. Positioned in the borehole 101 are seismic sensors (detectors) denoted by 111*a*, 111*b*, 111*c*, 111*d*. Each of the sensors may include one or more of (i) a hydrophone, (ii) a single-component geophone and (iii) a multi-component geophone. Data for a single offset VSP is typically acquired using a single seismic source such as 125 at the surface (or within a body of water at the surface). Exemplary raypaths (112*a*, 112*b*, 112*c*, 112*d*) from the source location 123 to the plurality of receiver locations 111*a*, 111*b*, 111*c*, 111*d* are shown. In addition to receiving the direct arrivals from the source, each receiver would also receive reflected signals from boundaries below the reflector. To simplify the illustration, these boundaries and reflected raypaths are not shown. However, as discussed later, these reflected signals may be removed using prior art methods for wavefield separation.

In a typical VSP, data resulting from operation of a source at a single position such as 125 are recorded in each of the receivers 111*a*, 111*b*, 111*c*, 111*d* in the borehole. Analysis of the downgoing signals can provide information about the seismic velocities in the subsurface and the absorption in the subsurface.

Q-estimation from zero-offset VSP data is based on a linear absorption dependence on frequency (constant Q). Because of this linear dependence with frequency, the attenuation process may be expressed as:

$$S_2(f) = Const \times S_1(f) e^{-\pi f \frac{\Delta t_{1,2}}{Q_{1,2}}}, \tag{1}$$

where $S_1(f)$ and $S_2(f)$ are amplitude spectra of a downgoing wave at the levels $z_1$ and $z_2$; $\Delta t_{1,2}$ is one-way time between levels $z_1$ and $z_2$, f is frequency in Hertz. Eqn. (1) is used in the spectral ratio method to estimate Q from zero-offset VSP data. Normally Q-factor is estimated for the well interval from shallow to deep receivers. The downgoing wavefield produced by a source at the surface 123 may be used to calculate amplitude spectra and used for estimating Q. To make the estimation more stable, several shallow receiver amplitude spectra may be averaged, as well as several deep receiver amplitude spectra.

Eqn. (1) gives:

$$\log \frac{S_N(f)}{S_1(f)} = C - \alpha \Delta t_{1,N} f = C - bf, \tag{2}$$

where C is a constant (attenuation factor that does not depend on frequency), and α is the effective absorption coefficient:

$$\alpha = \frac{\pi}{Q_{1,N}} \tag{3}$$

$S_1(f)$ and $S_N(f)$ are averaged amplitude spectra for the shallow and deep receivers. Coefficient α is the slope of the line fitted to function $P_{1,N}(f)$:

$$P_{1,N}(f) = \log \frac{S_N(f)}{S_1(f)} \tag{4}$$

In other words, a straight line may be estimated using the least-squared method by minimizing quadratic function F(a, α):

$$F(b, \alpha) = \sum_{f=F_1}^{F_2} [P_{1,N}(f) - b - \alpha \Delta t_{1,N} f]^2 \tag{5}$$

where $F_1$ and $F_2$ are minimum and maximum frequencies used for the Q estimate.

This spectral-ratio approach has two major drawbacks:
1. Function log(x) is strongly non-linear, and for small argument (small values of x) changes dramatically even for small changes in x.
2. The method uses only few amplitude spectra, and can lead to a poor vertical resolution and non-realistic Q values, including negative values.

Eqn. (2) may be rewritten as:

$$\alpha = \frac{C - P_k}{f_k \Delta t} \tag{6}$$

where $$P_k = \log \frac{S_2(f_k)}{S_1(f_k)}$$

The present disclosure uses a new method for Q determination: an optimization approach based on exponent (not ratio) estimate of Q-factor for all receiver pairs. First, the calculation approach to estimate Q for two receivers with amplitude spectra $S_1(f)$ and $S_2(f)$ may be modified. Instead of taking a logarithm of the ratio of the two receivers, an objective function may be used that calculates the average squared difference between these spectra. Eqn. (1) may be rewritten as:

$$S_2(f) = C \times S_1(f) e^{-\alpha f}, \tag{7}$$

where C is a constant and α is defined by formula (3). Then, to find C and α, minimization of an objective function G:

$$G(\alpha, C) = \sum_{f=F_1}^{F_2} [S_2(f) - C \times S_1(f) e^{-\alpha f}]^2 \tag{8}$$

may be performed.

Determination of the constant C may be performed by solving the linear equation $$\frac{\partial G}{\partial C} = 0, \tag{9}$$

which leads to $$C = \frac{\sum_{f=F_1}^{F_2} [S_2(f) S_1(f) e^{-\alpha f}]}{\sum_{f=F_1}^{F_2} [S_1^2(f) e^{-2\alpha f}]} \tag{10}$$

Substitution of eqn. (10) into eqn. (9), may yield:

$$G(\alpha, C) = \sum_{k=K_1}^{K_2} \left[ S_2(f_k) - S_1(f_k)e^{-\alpha f_k} \frac{\sum_{j=J_1}^{J_2}[S_2(f_j)S_1(f_j)e^{-\alpha f_j}]}{\sum_{f=J_1}^{J_2}[S_1^2(f_j)e^{-2\alpha f_j}]} \right]^2 \quad (11)$$

The absorption coefficient α may be estimated by scanning the objective function over a range of α and using the value that minimizes the eqn. (9).

Figure 2:
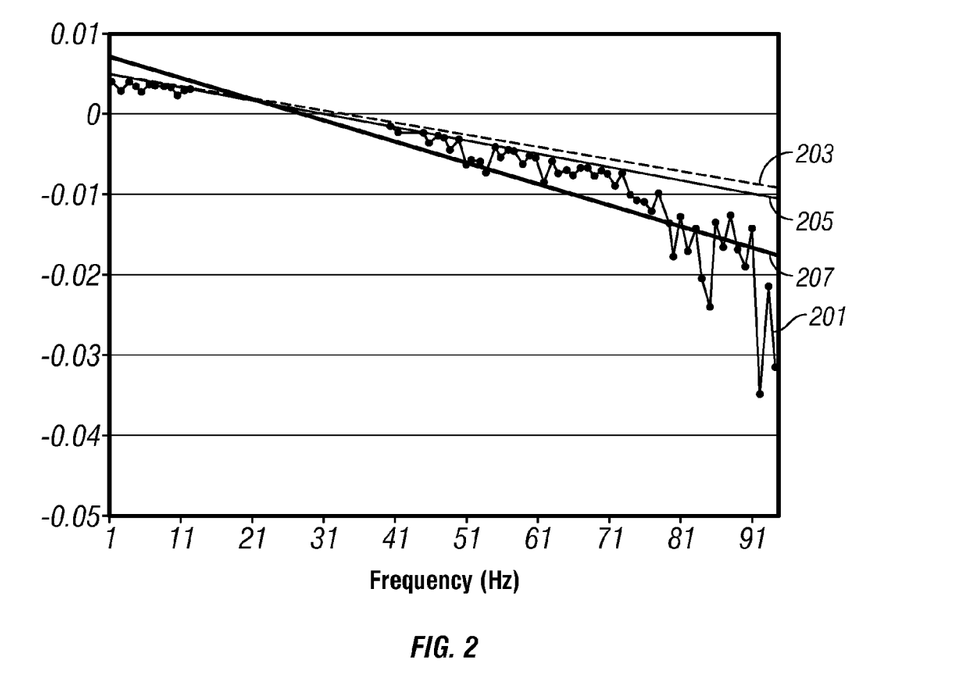
FIG. 2 shows spectral ratio curves for 40 ms of propagation time for different methods of Q estimation in the presence of noise.

The discussion above is illustrated by a model. For example, a homogeneous model with Q=100 may be used. The travel time between two receivers may be 30 ms. Amplitude spectra for the first receiver may be calculated for a real VSP downgoing trace. After using eqn. (1), random noise of 0.5% of average spectrum amplitude may be added to the spectrum at the second trace. This is shown by the curve 201 in FIG. 2. For high frequencies (between 80 and 100 Hz) the random noise may be about 30% of the amplitude spectrum, which distorts logarithm of the ratio for these frequencies. Curve 203 shows linear approximation of no-noise spectra ratio (corresponds to Q=100), curve 205 stands for linear approximation of noisy spectra ratio and leads to Q=48. Curve 205 corresponds to exponent estimate and gives Q=77, which is closer to model Q=100. Curve 207 corresponds to a spectral ratio estimate and gives Q=48.

To illustrate the influence of a propagation time on Q estimation in Table 1, the same added noise level (0.5% of average spectrum amplitude) was used, but with different times between points 1 and 2. Time intervals for Δt=10, 20, 40, 60, 80 and 100 ms were used. Table 1 shows the results on the modeling. It can be seen that for this noise/signal ratio (0.5% of average spectrum amplitude), for the time delay less than 40 ms, both methods lead to a large error in Q. For Δt=50 ms, exponent estimates provide accurate Q value (Q=92), while spectral ratio method leads to an essential error (Q=75).

TABLE 1

| Propagation time | Spectral ratio | Exponential |
|---|---|---|
| 10 ms | 12 | 19 |
| 20 ms | 22 | 34 |
| 30 ms | 48 | 77 |
| 40 ms | 63 | 88 |
| 50 ms | 75 | 92 |
| 60 ms | 88 | 96 |
| 70 ms | 92 | 98 |
| 80 ms | 97 | 99 |
| 90 ms | 98 | 100 |
| 100 ms | 100 | 100 |

Figure 3:
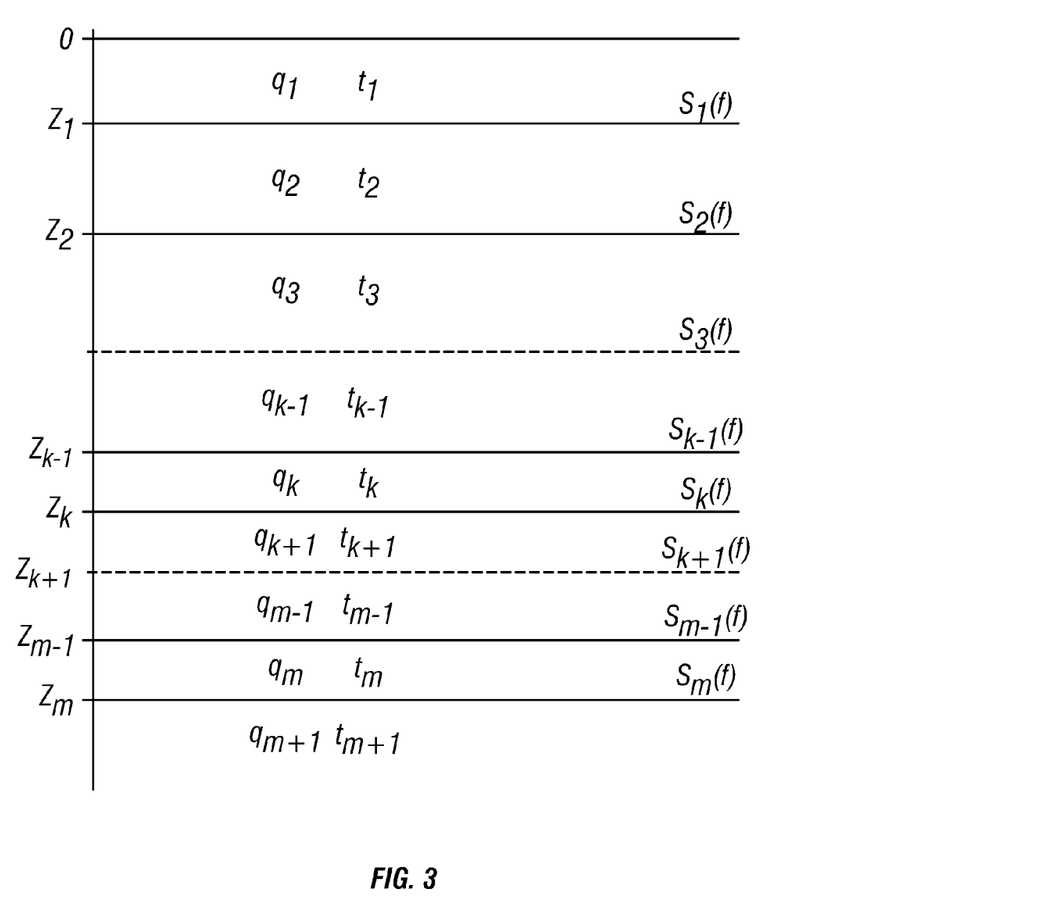
FIG. 3 shows a layered model illustrating the method of the present disclosure.

Next, interval Q estimates based on optimization approach that uses all reasonable spectra pairs are described. Consider several receivers at the depths $z_1, z_2, \ldots, z_n$. The notation A=1/Q is used for the layered Q (cumulative Q to this layer) and α=1/Q for the interval Q. $q_k$ denotes Q between two consecutive levels $z_{k-1}$ and $z_k$, as shown in FIG. 3. $Q_{k,m}$, m>k+1, denotes Q for this layer, which includes more than two receivers. The same meaning is for α and A: $\alpha_k$ is an interval absorption for the interval "k" between two depths $z_{k-1}$ and $z_k$: $\alpha_k=1/q_k$. $A_{m,n}$ is a layered absorption coefficient, $A_{m,n}=1/Q_{m,n}$. $A_m$ is a cumulative absorption coefficient with the first/shallowest reference trace.

For two receivers at the depths $z_1$ and $z_2$, assuming homogeneous interval and vertical propagation;

$$S_2(f) = \text{Const} \times S_1(f)e^{-f\alpha 2\Delta t2} \quad (12)$$

Here $S_1(f)$ and $S_2(f)$ are amplitude spectra of downgoing wave at the levels $z_1$ and $z_2$; $\Delta t_{1,2}$ is one-way time, f is the frequency in Hertz.

If $A_{k,m}$ is the effective absorption coefficient between depths $z_1$ and $z_2$, then:

$$S_m(f) = \text{Const} \times S_k(f)e^{-A_{k,m}(T_m - T_k)} \quad (13)$$

where $t_m$ is the time from the surface to the depth $z_m$. On the other hand, applying eqn. (12) to the levels $z_k, z_{k+1}, \ldots, z_{k+m}$:

$$\begin{aligned} S_m(f) &= \text{Const} \times S_{m-1}(f)e^{-f\alpha_m t_m} \\ &= \text{Const} \times S_{m-2}(f)e^{-f\alpha_m t_m}e^{-f\alpha_{m-1}t_{m-1}} \\ &= \text{Const} \times S_{m-2}(f)e^{-f(\alpha_m t_m + \alpha_{m-1}t_{m-1})} \\ &= \ldots \text{Const} \times S_k(f)\exp\left(-f\sum_{j=k+1}^{m}\alpha_j t_j\right) \end{aligned}$$

From this and eqn. (2) it follows that:

$$\begin{aligned} A_{k,m}(T_m - T_k) &= \sum_{j=k+1}^{m} \alpha_j t_j \\ &= \sum_{j=1}^{m} \alpha_j t_j - \sum_{j=1}^{k} \alpha_j t_j \\ &= A_m T_m - A_k T_k \end{aligned} \quad (14)$$

where $Q_k$ is effective quality factor (absorption coefficient). Eqn. (14), gives three main formulas that are useful:

$$A_{k,m} = \frac{1}{\Delta T_{k,m}} \sum_{j=k+1}^{m} \alpha_j t_j \quad (15)$$

$$\alpha_k = \frac{A_k T_k - A_{k-1}T_{k-1}}{t_{k-1}} = \frac{A_k T_k - A_{k-1}T_{k-1}}{T_k - T_{k-1}} \quad (16)$$

$$A_{k,m} = \frac{A_k T_k - A_m T_m}{T_m - T_k} \quad (17)$$

$$\Delta T_{k,m} = \sum_{j=k+1}^{m} t_j = T_m - T_k$$

Turning now to the situation with receivers and three depths: $z_r < z_m < z_n$, applying eqn. (17) for pairs (k,m) and (k,n) gives:

$$\Delta T_{r,m} A_{r,m} \sum_{j=r+1}^{m} \alpha_j t_j \quad (18)$$

$$\Delta T_{r,n} A_{r,n} \sum_{j=r+1}^{n} \alpha_j t_j$$

In eqn. (18), $z_r$ may be considered as a reference depth, which may be used to calculate Q for two intervals $[z_r, z_m]$ and $[z_r, z_n]$.

Then $$\Delta T_{r,n}A_{r,n} - \Delta T_{r,m}A_{r,m} = \sum_{j=r+1}^{n} \alpha_j t_j - \sum_{j=r+1}^{m} \alpha_j t_j$$

$$= \sum_{j=m+1}^{n} \alpha_j t_j$$

$$= \Delta T_{m,n}A_{m,n}$$

This gives the results:

$$A_{m,n} = \frac{\Delta T_{r,n}A_{r,n} - \Delta T_{r,m}A_{r,m}}{T_n - T_m} \quad (19)$$

where $z_r$ is any reference level above the segment $[z_m, z_n]$. It should be noted that in eqn. (19), reference trace k may be not only above the segment $[z_m, z_n]$ ($z_r < z_m < z_n$), but also below: $z_m < z_n < z_r$.

Figure 4:
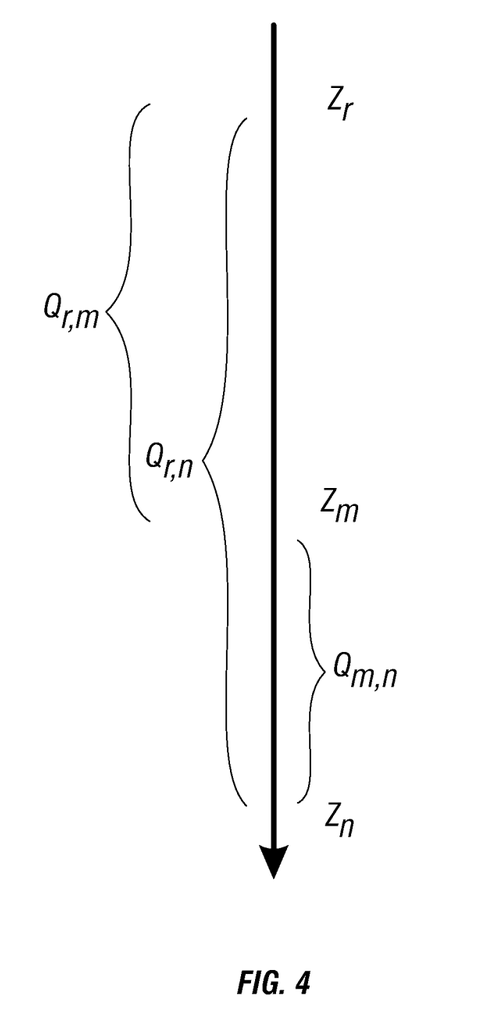
FIG. 4 shows estimation through two layers (three receivers)

Eqn (19) implies that, in addition to eqn (6), any level r ($r < m < n$) may be used to estimate $Q_{m,n}$ between levels m and n, that is, for the segment $[z_m, z_n]$ shown in FIG. 4. For each segment $[z_m, z_n]$, not only may the amplitude spectra $Q_m$ and $Q_n$ eqn (17) be used, but also different reference traces above and below this segment that we use to calculate $Q_{m,n}$ through eqn. (19). Using many different reference traces to estimate segment Q makes it more stable.

To find an initial approximation, eqns. (6) and (8) may be used. To determine this approximation, all reasonable spectra pairs (eqn. (6)), and also all possible triples spectra at the level $z_r$, $z_m$ and $z_n$ where $z_r < z_k < z_m$ may be used. Here $z_r$ is a reference depth, and Q(m,n) may be calculated using two Q values: $Q_{r,m}$ and $Q_{r,n}$. If the trace window is defined as the receivers located between two receivers at the depths $z_m$ and $z_n$ and the amplitude spectra at these two receivers at the depths $z_m$ and $z_n$ are used, then it is possible to determine average Q in this window, that is, $Q_{m,n}$. Moving the trace window along the well and average $Q_s$ for a set of overlapping windows can be calculated. Windows with a reasonable Q (e.g. the values inside a range from 20 to 200) are retained. By averaging these window Qs and calculating interval Q, that is, Q between each consecutive receivers, an initial approximation may be estimated. The initial approximation may be further improved by minimizing objective function, which is the squared average difference between calculated Qs and may be determined from trace windows.

To determine interval absorption coefficients $\alpha_k$, the objective function F with respect to $\alpha_j$ is minimized:

$$F(\alpha) = \quad (20)$$

$$\sum_{m>k=1}^{N} u_{km}\left[A_{k,m} - \frac{1}{T_m - T_k}\sum_{j=k+1}^{m} \alpha_j(T_j - T_{j-1})\right]^2 + \sum_{j=2}^{N} w_j(\alpha_j - \beta_j)^2$$

where $\beta_j$ are initial approximations for $\alpha_j$. In eqn (20), weights $w_j$ depend on quality of $Q_{k,m}$ estimates. The weights $u_{k,m}$ are used according to:

$$u_{m,n} = \frac{1}{\sigma_{m,n} + \sigma_{Aver}} \quad (21)$$

where $\sigma_{m,n}$ is a standard deviation of Q estimate for the layer $[z_k, z_m]$; $\sigma_{Aver}$ is an average standard deviation over all pairs. Weights $w_j$ are for regularization purpose to keep solutions within given range. The optimization of $F(\alpha)$ is done iteratively: at the first iteration, all the weights $w_j$ are the same. After minimization, the coefficients $\alpha_j$ may be checked against a given range, and the weights $w_j$ of $\alpha_j$ that are outside the given range may be increased. In a second iteration, $F(\alpha)$ may be optimized by applying new weights $w_j$ and again checking the output absorption coefficients $\alpha$. If some of the coefficients $\alpha_j$ are outside the range, we increased corresponding weights and continue iterations until all $\alpha_j$ are within a given range. The function in eqn. (20), may be minimized by solving the linear system of equations:

$$\frac{\partial F(\alpha)}{\partial \alpha_j} = 0. \quad (22)$$

In eqn. (20), only those $A_{km}$ that are within a given range may be retained. If all $Q_{km}$ are within a reasonable range, then there would be $N(N-1)/2$ values. Normally, about ⅓ of this number are within a reasonable range, that is, about $0.15N^2$. For N=100 traces, there would be about 1500 values. Taking into account that different reference numbers that are used to estimate layered Q, there may be about 10000 input Qs to estimate 99 unknown intervals $q_j$. This provides sufficient statistics for a stable Q estimation. Resolution of Q estimation may depend on the length of intervals $[z_k, z_m]$ that provide reasonable Q values.

Figure 5:
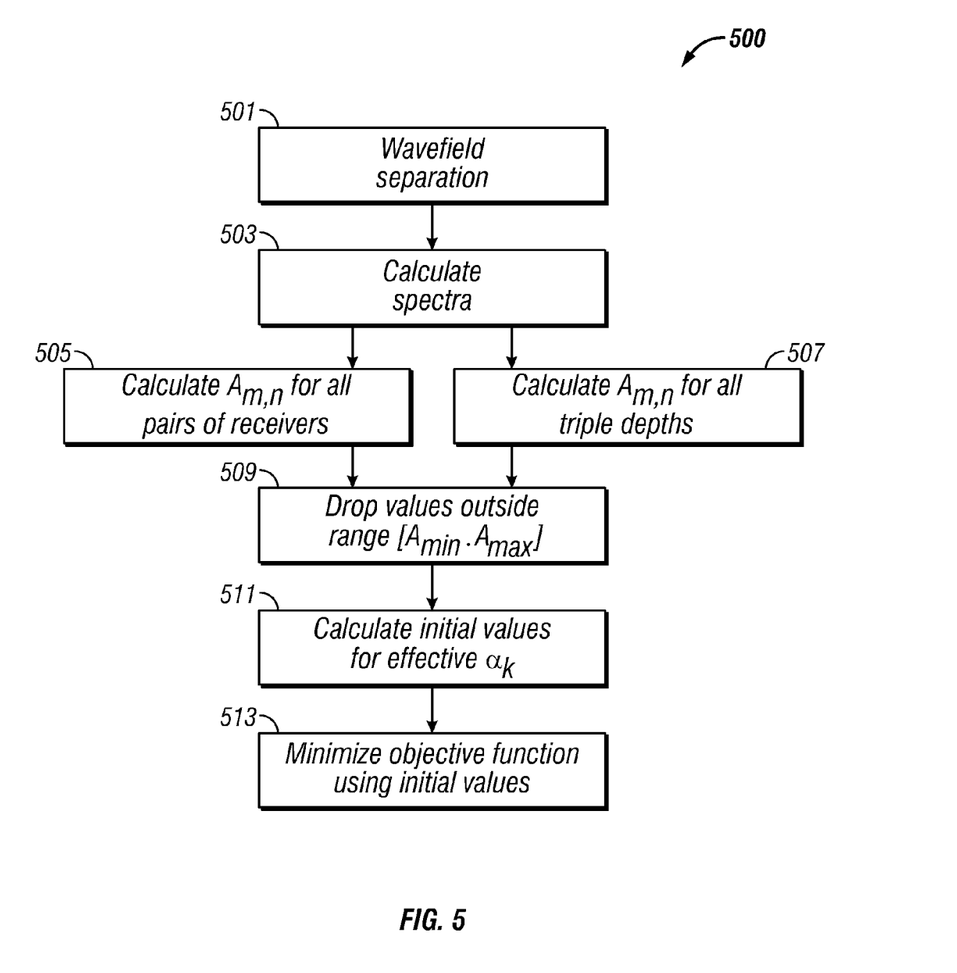
FIG. 5 shows a flow chart of some of the steps in the method of the present disclosure.

Turning now to FIG. 5, some of the steps of one method 500 according to an embodiment of the present disclosure are illustrated. In step 501, Zero- or small-offset VSP data may be acquired and a wavefield separation may be used to separate the downgoing wavefield from the upgoing wavefield using known prior art techniques. For the purposes of the present disclosure, the term "zero-offset" includes data acquired using a source as close to the wellhead as practical. It should be noted that the upgoing wavefield may be a compressional wavefield or a shear wavefield.

In step 503, the amplitude spectra $S_j(f)$ for all receivers, j=1, 2, . . . , N; (where N is the number of receivers) may be calculated for the downgoing wavefield. In step 505, an effective layered absorption coefficient $A_{m,n}$ corresponding to the depth interval $[z_m, z_n]$ may be estimated for each of the receiver pairs at depths $z_m - z_n$. This absorption coefficient $A_{m,n}$ may be calculated by minimizing eqn. (11), where $A_{m,n} = \alpha$. In step 507, another effective absorption coefficient $A_{m,n}$ may be estimated using all possible triple depths $z_r$, $z_n$ and $z_m$ and eqn. (19).

In step 509, From calculated layered, effective absorption coefficients that are outside input range $[A_{min}, A_{max}]$ of the calculated layered $A_{m,n}$ may be dropped. It may be assumed that a reasonable range for the Q-factor has been selected, thus a range for effective absorption coefficient $\alpha$ may be calculated using eqn. (3):

$$A_{min} = \pi/Q_{max}, A_{max} = \pi/Q_{min}.$$

A reasonable range for the Q factor can be obtained from published literature and knowledge of the lithology of the subsurface that is expected.

In step 511, the above remaining effective absorption coefficients $A_{m,n}$ may be used to calculate initial values for interval effective absorption coefficients $\alpha_k$. For this, the average remaining layered effective absorption coefficients $A_{m,n}$ with respect to common depth interval $[z_{k-1}, z_k]$ may be used interval effective absorption coefficients $\alpha_k$, corresponding to the interval $[z_{k-1}, z_k]$, may be obtained.

In step 513, the initial values may be improved by minimizing objective eqn. (20) iteratively. In the first iteration, all the weights $w_j$ may be the same. After minimization, $\alpha_j$ may be checked, and, for those $\alpha_j$ that are outside given range, the weights $w_j$ may be increased for those $\alpha_j$ that are outside the given range. In the second iteration, eqn. (20) may be optimized with new weights $w_j$ and the output absorption coefficients $\alpha_j$ may be checked again. If some of the coefficients $\alpha_j$ are outside the range, the corresponding weights may be increased and the iterations may continue until all $\alpha_j$ are within a given range.

The processing methodology described above may be implemented on a general purpose digital computer. As would be known to those versed in the art, instructions for the computer reside on a computer-readable memory device such as ROMs, EPROMs, EAROMs, Flash Memories and Optical disks. These may be part of the computer or may be linked to the computer by suitable communication channels, and may be even at a remote location. These are all examples of non-transitory computer-readable media. Similarly, seismic data of the type discussed above may be stored on the computer or may be linked through suitable communication channels to the computer. The communication channels may include the Internet, enabling a user to access data from one remote location and get the instructions from another remote location to process the data. The instructions on the computer-readable memory device enable the computer to access the multicomponent data and process the data according to the method described above.

While the foregoing disclosure is directed to the specific embodiments of the invention, various modifications will be apparent to those skilled in the art. It is intended that all such variations within the scope and spirit of the appended claims be embraced by the foregoing disclosure.

What is claimed is:

1. A method of evaluating an earth formation, the method comprising:
   acquiring seismic data using a plurality of seismic detectors, each at one of a plurality of spaced apart locations in a wellbore, responsive to activation of a seismic source near a top of the wellbore;
   estimating a spectrum of a down going wave field of the acquired seismic data at each of the plurality of seismic detectors by separating the down going wave field from an up going wave field of the acquired seismic data;
   estimating an absorption coefficient of the earth formation for at least one pair of the plurality of seismic detectors by minimizing an objective function based on an exponential relation between the spectra of the at least one pair of seismic detectors; and
   evaluating the earth formation using the estimated absorption coefficient to indicate at least one of (i) a lithology and (ii) a fluid content of the earth formation.

2. The method of claim 1 wherein the at least one pair of seismic detectors further comprises (i) a plurality of pairs of the plurality of seismic detectors at the spaced apart locations, and (ii) a plurality of pairs defined by a triplet of the plurality of seismic detectors.

3. The method of claim 2 further comprising eliminating a pair of seismic detectors that gives an absorption coefficient outside a predefined range.

4. The method of claim 1 further comprising using the estimated absorption coefficient as a starting value for obtaining an improved estimated absorption coefficient by minimizing an objective function F of the form:

$$F(\alpha) = \sum_{m>k=1}^{N} u_{km} \left[ A_{k,m} - \frac{1}{T_m - T_k} \sum_{j=k+1}^{m} \alpha_j (T_j - T_{j-1}) \right]^2 + \sum_{j=2}^{N} w_j (\alpha_j - \beta_j)^2$$

where $\beta_j$ are initial approximations for $\alpha_j$; $w_j$ are weights given by $$u_{m,n} = \frac{1}{\sigma_{m,n} + \sigma_{Aver}}$$

where $\sigma_{m,n}$ is a standard deviation of Q estimate for the layer $[z_k, z_m]$; and $\sigma_{Aver}$ is an average standard deviation over all pairs.

5. The method of claim 1 further comprising using the estimated absorption coefficient for further processing of the acquired seismic data in formation evaluation.

6. The method of claim 1 wherein activation of the seismic source generates a seismic wave, the seismic wave being one of: (i) a compressional wave, and (ii) a shear wave.

7. A system configured to evaluate an earth formation, the system comprising:
   a plurality of seismic detectors, each positioned at a plurality of spaced apart locations in a wellbore, configured to acquire seismic data comprising a signal responsive to activation of a seismic source near a top of the wellbore; and
   at least one processor configured to:
      estimate a spectrum of the acquired signal of a down going wave field of the acquired seismic data at each of the plurality of seismic detectors by separating the down going wave field from an up going wave field of the acquired seismic data;
      estimate an absorption coefficient of the earth formation for at least one pair of the plurality of seismic detectors by minimizing an objective function based on an exponential relation between the spectra of the at least one pair of seismic detectors; and
      evaluate the earth formation using the estimated absorption coefficient to indicate at least one of (i) a lithology and (ii) a fluid content of the earth formation.

8. The system of claim 7 wherein the at least one pair of seismic detectors further comprises (i) a plurality of pairs of detectors at the spaced apart locations, and (ii) a plurality of pairs defined by a triplet of the plurality of seismic detectors.

9. The system of claim 8 wherein the processor is further configured further eliminate a pair of seismic detectors that gives an absorption coefficient outside a predefined range.

10. The system of claim 7 wherein the processor is further configured to use the estimated absorption coefficient as a starting value for obtaining an improved estimated absorption coefficient by minimizing an objective function F of the form:

$$F(\alpha) = \sum_{\substack{m>k=1}}^{N} u_{km}\left[A_{k,m} - \frac{1}{T_m - T_k}\sum_{j=k+1}^{m}\alpha_j(T_j - T_{j-1})\right]^2 + \sum_{j=2}^{N} w_j(\alpha_j - \beta_j)^2$$

where $\beta_j$ are initial approximations for $\alpha_j$; $w_j$ are weights given by $$u_{m,n} = \frac{1}{\sigma_{m,n} + \sigma_{Aver}}$$

where $\sigma_{m,n}$ is a standard deviation of Q estimate for the layer $[z_k, z_m]$; and $\sigma_{Aver}$ is an average standard deviation over all pairs.

11. The system of claim 7 wherein the processor is further configured to use the estimated absorption coefficient for further processing of the acquired seismic data in formation evaluation.

12. The system of claim 7 wherein the source is configured to generate a seismic wave selected from: (i) a compressional wave, and (ii) a shear wave.

13. A non-transitory computer-readable medium product having stored thereon instructions that when read by at least one processor cause the at least one processor to execute a method, the method comprising:

using seismic data acquired by a plurality of seismic detectors, each at one of a plurality of spaced apart locations in a wellbore, responsive to activation of a seismic source near a top of the wellbore for estimating a spectrum of a down going wave field of the acquired seismic data at each of the plurality of seismic detectors by separating the down going wave field from an up going wave field of the acquired seismic data;

estimating an absorption coefficient of the earth formation for at least one pair of the plurality of seismic detectors by minimizing an objective function based on an exponential relation between the spectra of the at least one pair of seismic detectors; and evaluating the earth formation using the estimated absorption coefficient to indicate at least one of (i) a lithology and (ii) a fluid content of the earth formation.

14. The non-transitory computer-readable medium product of claim 13 further comprising at least one of: (i) a ROM, (ii) an EPROM, (iii) an EAROM, (iv) a flash memory, and (v) an Optical disk.

* * * * *